United States Patent [19]

Burgoyne, Jr. et al.

[11] Patent Number: 4,745,223
[45] Date of Patent: May 17, 1988

[54] MONO-TERTIARY-ALKYLATED TOLUENEDIAMINE AND DERIVATIVES

[75] Inventors: William F. Burgoyne, Jr., Allentown; Jeremiah P. Casey, Emmaus; Dale D. Dixon, Kutztown; Barton Milligan, Coplay, all of Pa.

[73] Assignee: Air Products and Chemicals, Inc., Allentown, Pa.

[21] Appl. No.: 768,885

[22] Filed: Aug. 23, 1985

Related U.S. Application Data

[63] Continuation-in-part of Ser. No. 659,597, Oct. 11, 1984.

[51] Int. Cl.$^4$ .............................................. C07C 87/58
[52] U.S. Cl. ................................................... 564/305
[58] Field of Search ........................ 564/304, 305, 436

[56] References Cited

U.S. PATENT DOCUMENTS

| | | | |
|---|---|---|---|
| 2,706,735 | 4/1955 | Ferstandig | 260/465 |
| 2,737,536 | 3/1956 | Bloch et al. | 260/671 |
| 2,762,845 | 9/1956 | Stroh et al. | 564/409 |
| 2,963,504 | 12/1960 | Thelin et al. | 260/453 |
| 3,222,401 | 12/1965 | Schmerling | 44/72 |
| 3,275,690 | 9/1966 | Stroh et al. | 564/409 |
| 3,428,610 | 2/1969 | Klebest | 528/59 |
| 3,794,621 | 2/1974 | Meckel et al. | 528/64 |
| 3,991,023 | 11/1976 | Blahak et al. | 521/159 |
| 4,218,543 | 8/1980 | Weber et al. | 521/51 |
| 4,365,051 | 12/1982 | Ehung | 523/64 |
| 4,440,952 | 4/1984 | Ihrman | 564/305 |
| 4,482,690 | 11/1984 | Orphamides | 528/64 |
| 4,526,905 | 7/1985 | Lucast et al. | 521/51 |
| 4,529,746 | 7/1985 | Markovs et al. | 521/159 |

FOREIGN PATENT DOCUMENTS

0069286 6/1982 European Pat. Off. .
1051271 7/1955 Fed. Rep. of Germany .
846226 12/1958 United Kingdom .

*Primary Examiner*—Glennon H. Hollrah
*Assistant Examiner*—John A. Sopp
*Attorney, Agent, or Firm*—Russell L. Brewer; James C. Simmons; William F. Marsh

[57] ABSTRACT

This invention relates to a class of tertiary-alkyl-toluenediamines having alkyl groups ortho to an amine group. More particularly the aromatic diamines are represented by the formulas:

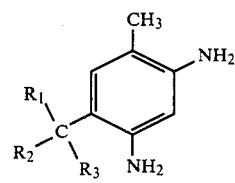

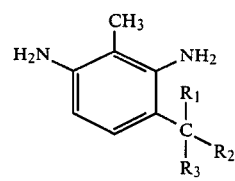

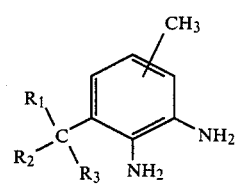

wherein $R_1$, $R_2$ and $R_3$ are $C_{1-3}$ alkyl groups or $R_2$ and $R_3$ are combined to form a $C_{5-6}$ membered ring.

The above described alkylated aromatic diamines have been found to be well suited for use as a chain extender in forming polyurethane/urea elastomer systems and the mono tert-butyltoluenediamine isomers have been found to be nonmutagenic in the Ames test.

10 Claims, 5 Drawing Sheets

MONO-TERTIARY-ALKYLATED TOLUENEDIAMINE AND DERIVATIVES

CROSS REFERENCE TO RELATED APPLICATION

This application is a continuation-in-part of U.S. Ser. No. 659,597 having a filing date of Oct. 11, 1984 and the subject matter of that application is incorporated by reference.

TECHNICAL FIELD

This invention pertains to mono-tertiary alkyl derivatives of toluenediamine.

BACKGROUND OF THE INVENTION

Alkylated diamines have been known for a substantial period of time and find use in the preparation of polyurethane elastomers. The diamines are typically used in that form as chain extenders for polyurethanes, i.e., forming a short chain urea linkage to strengthen the elastomer. As is known, the alkyl group alters the reactivity of the amine thus giving the composition unique processing properties for producing polyurethane elastomers.

A secondary use for the alkylated diamine products is in the manufacture of diisocyanates which are also suited for the synthesis of polyurethane elastomers. They can also be used for plasticizers, or as intermediates for the manufacture of pesticides and alkyd resin modifiers.

Two types of synthesis techniques have been used to produce alkylated aromatic amines, such as, an alkylated toluenediamine. One of the earliest techniques used to prepare an alkylated aromatic diamine employed a Friedel-Crafts alkylation of an aromatic hydrocarbon, then dinitration of the alkylated aromatic hydrocarbon followed by reduction of the nitro groups to amine groups. The diamine could be converted to the diisocyanate by reaction with phosgene. Another technique for producing alkylated aromatic amines involved nitration of the aromatic hydrocarbon, followed by reduction to the amine and alkylation of the amine. Representative patents illustrating various alkyl aromatic diamines and derivatives thereof are as follows:

U.S. Pat. No. 2,963,504 discloses a 2,6-diisocyanato-4-tert-butyltoluene composition which was formed from the 2,6-diamino-4-tert-butyltoluene derivative. No synthesis technique was shown. However, from the disclosed isomer structure, the product was produced by alkylating toluene, and then dinitrating the alkylated product followed by reducing the nitro group to amine.

In an article by Geuze, et al., preparation and proof of the constitution of 3,5-di-tert-butyltoluene, Rec. Trav. Pays-Bas, 75,306 (1956) and particularly examples 4 and 5 show the production of 2-amino-3,5-di-tert-butyltoluene and 2,6-diamino-3,5-di-tert-butyltoluene by the nitration and subsequent reduction of di-tertiarybutyltoluene.

U.S. Pat. No. 2,706,735 discloses 5-tert-butylisophthalonitrile. This derivative was prepared by reacting 5-tert-butylisophthalonitrile. This derivative was prepared by reacting 5-tert-butylisophthalic acid with ammonia over activated alumina at high temperature.

U.S. Pat. No. 3,991,023 discloses aromatic ester amine derivatives of benzoic acid and alkylated derivatives of aromatic ester amine derivatives of benzoic acid.

U.S. Pat. No. 4,365,051 discloses alkyl aromatic amine benzonitriles and alkyl aromatic amine benzoates as chain extenders for polyurethane manufacture;

U.S. Pat. No. 3,794,621 discloses aromatic amine esters as chain extenders for polyurethanes.

In all of the above aromatic amine compositions, the alkyl group is para to another organo group whether the organo group is a methyl group as in the case of toluene or an ester or nitrile group as in the case of aromatic esters or aromatic nitriles. As noted, these products are suited for use in the manufacture of isocyanates and polyurethanes.

Numerous aromatic amines having alkyl groups ortho to the amine, as opposed to being para to the amine, have also been used to produce polyurethane resins. In some instances, these amines have been either monoalkyl or dialkyl derivatives of the amines where the alkyl group has 2–3 carbon atoms. The art has recognized that these alkyl groups drastically alter the reactivity of the aromatic diamine. For example, ortho-alkylated diethyltoluenediamine is desirable for use in a urethane molding technique referred to as RIM (reaction injection molding).

U.S. Pat. Nos. 3,428,610 and 4,218,543 disclose the use of alkylated toluenediamines in the manufacture of polyurethane resins with the '543 patent showing its use in RIM manufacturing techniques. Alkylated diamines include 1-methyl-3,5-diethylphenylene-2,4-diamine and 1,3,5-trimethylphenylene-2,4-diamine. The diethyltoluenediamine derivative is referred to as diethyl TDA or DETDA and is probably the most widely used alkylated derivative of toluenediamine for RIM manufacture.

There is disclosure in many patents disclosing a variety of alkylated aromatic amines, but only a few of such amines have been synthesized. Some examples of alkylated aromatic amines are found in the following patents:

U.S. Pat. No. 2,762,845 shows 2,6-diethylaniline, isopropylaniline, ethyltoluidine and diethyl-m-toluidine.

British Pat. No. 846,226 discloses both ortho and para-tert-butyl aniline;

U.S. Pat. No. 3,275,690 discloses isopropyl- and diisopropylaniline, mono and di-tert-butylaniline; ethylaniline and dimethyldiethylaniline.

AS Pat. No. 1,051,271 (West German) shows mono, di, and triisopropylaniline; and U.S. Pat. No. 3,222,401 discloses cycloalkyl derivatives of aniline such as ortho-cyclooctylaniline, ortho and para-(dimethylcyclohexyl)aniline and ortho and para-methylcyclopentylaniline.

U.S. Pat. No. 4,440,952 shows the synthesis of 1-methyl-2,4-diamino-5-isopropylbenzene and 1-methyl-2,6-diamino-3-isopropylbenzene and the use of the 2,6-isomer as a chain extender for polyurethane formulation.

European Pat. No. 0069286 discloses various alkyl-substituted phenylenediamines as chain extenders for the production of polyurethanes by reaction injection molding techniques. Some of the compositions suggested as being suited for such use include the 1,3-dimethyl-5-tert-butyl-2,6-diaminobenzene. 2-methyl-4,6-di-tert-butyl-1,3-diaminobenzene 1,3-dimethyl-5-tert-amyl-2,4-diaminobenzene.

European Pat. No. 0107108 discloses the synthesis of $C_{1-4}$ alkylated vicinal toluenediamines and their use as extender for the preparation of polyurethane-polymer elastomers. The example showed an ethylated vicinal toluenediamine.

U.S. Pat. No. 2,737,536 discloses the manufacture of a broad variety of tert-alkyl substituted aromatic hydrocarbons by reacting an aromatic hydrocarbon with a paraffinic hydrocarbon having a tertiary carbon atom in its structure in the presence of an olefinic hydrocarbon and an acidic alkylation catalyst. Mono and polyhydroxy benzenes, mono and polyaminobenzenes, hydroxyaromatic acids, aminophenols and many others were suggested as being alkylatable with paraffins such as methylbutane, methyl and dimethylpentanes and methylcyclopentanes and cycloalkanes. Catalysts suited for alkylation included acids such as hydrochloric acid.

Although a variety of alkylated aromatic diamine derivatives have been synthesized, e.g. diethyl TDA, such amines still present some problems to the formulator in terms of flexibility, handling and formulation. For example, in the manufacture of large molded parts even by RIM techniques, as in the manufacture of various automobile grilles, the reactivity of diethyl TDA may be too great to facilitate such molding techniques. They are also too reactive for the manufacture of cast elastomers. A second problem associated with alkylated aromatic diamines is that they are suspect carcinogens and present problems with respect to handling. This problem is similar to those aromatic amines having halogen atoms incorporated into the aromatic amine compositions to retard the activity of the amine in that such techniques have not altered the characteristics of the amine in terms of their mutagenic characteristics.

SUMMARY OF THE INVENTION

This invention pertains to mono-tert-alkyl toluenediamines and derivatives having a specific isomeric structure. In contrast to the prior art compositions, the tertiary alkyl group is ortho to an amine group and the alkyl group contains a tertiary carbon atom. These compositions are best represented by the formulas:

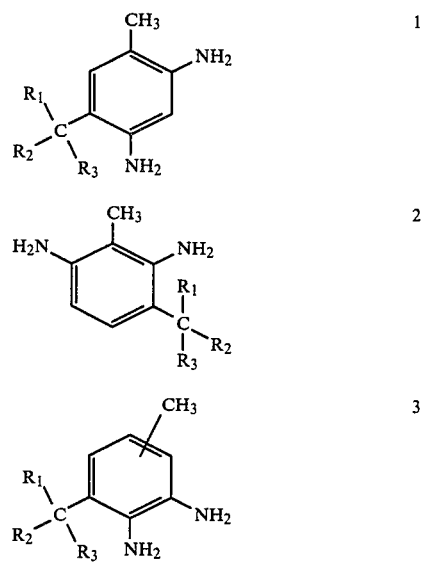

wherein $R_1$, $R_2$ and $R_3$ are $C_{1-3}$ alkyl groups or $R_2$ and $R_3$ are combined to form a $C_{5-6}$ membered ring.

There are several advantages associated with the specific isomeric compounds of this invention. One advantage is that the mono-tert-alkylated-2,6-toluenediamine has a reactivity which is slower than diethyl TDA, thus making the isomer mix more acceptable for the RIM urethane manufacture of a variety of large automobile parts. Another is that the 2,6-isomers have utility for cast elastomers. Thirdly, the mono tert-butyltoluenediamine isomers have shown no mutagenic activity in the Ames Test. Fourth, the mono-tert-alkyl-toluenediamine derivatives, when used as a chain extender, provide for extremely good physical properties in the resulting polyurethane elastomers. Fifthly, the mono-tert-alkylated toluenediamine can be converted to the isocyanate for producing unique properties in polyurethane resins; and sixthly, the isomers when blended in a ratio of about 80% 2,4-isomer and 20% 2,6-isomer form a liquid mix which is liquid at room temperature and which is well suited for formulation handling.

THE DRAWINGS

DETAILED DESCRIPTION OF THE INVENTION

Figure 1:
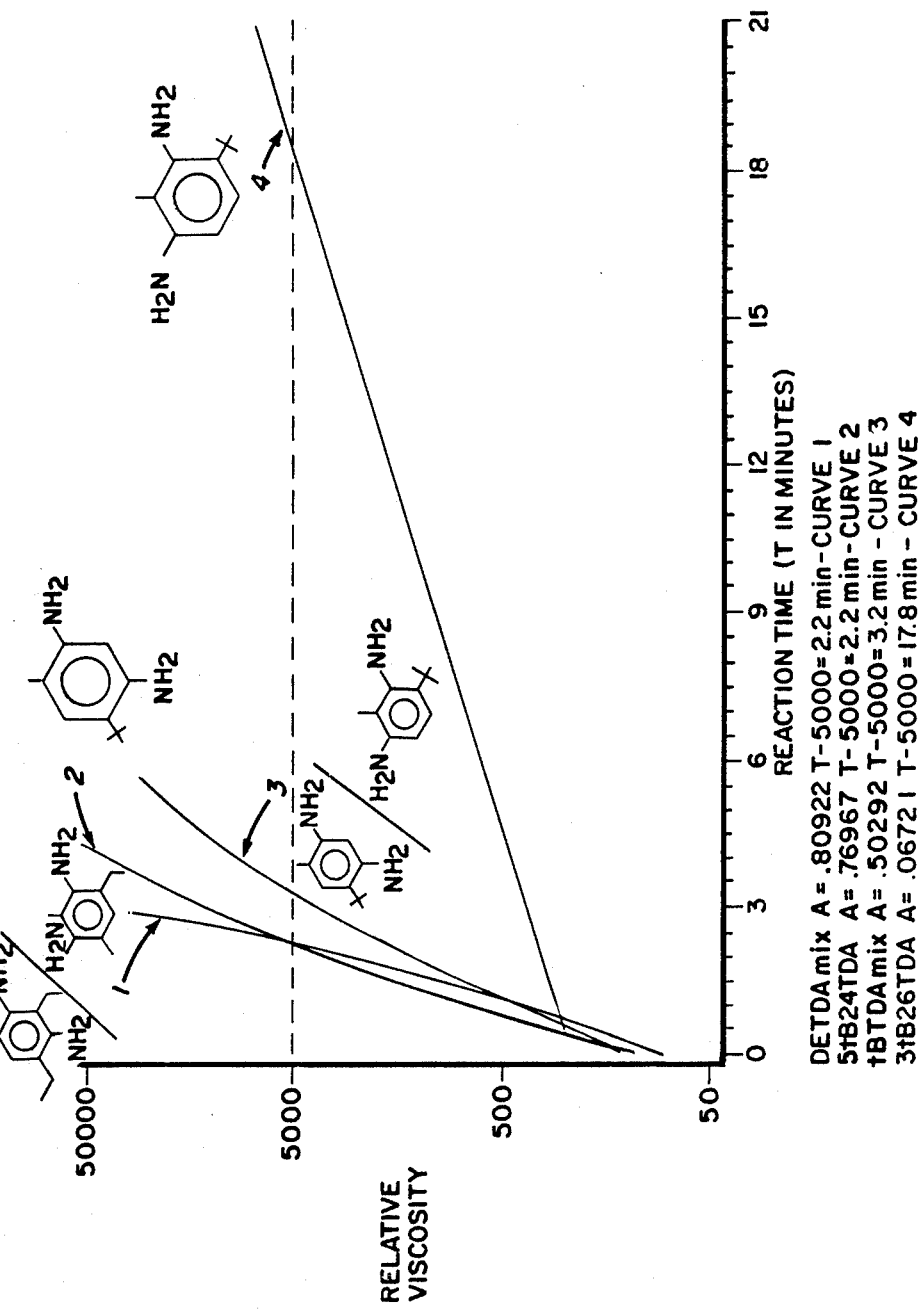
FIG. 1 is a plot of rheological data for mono tert-butyltoluene diamine and prior art DETDA candidates expressed as a function of time.

The compounds of this invention as indicated above, are represented by the formulas:

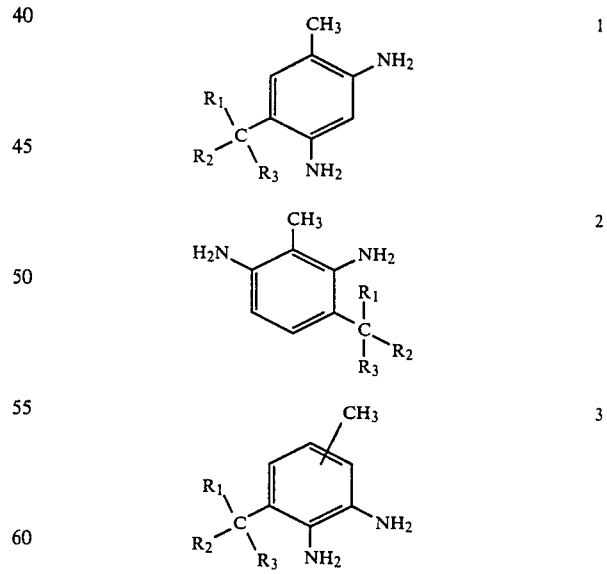

wherein $R_1$, $R_2$ and $R_3$ are $C_{1-3}$ alkyl groups or $R_2$ and $R_3$ are combined to form a $C_{5-6}$ membered ring.

The primary differences between the compositions described herein and those in the prior art, are: the compositions are mono alkyl substituted toluenediamine derivatives containing tertiary alkyl groups ortho to one amino group and the alkyl group contains a tertiary carbon atom, e.g. a t-butyl radical. As is shown, the toluenediamines are either the 2,4-diamino, the 2,6-diamino, or the 2;3 or 3,4-vicinal toluenediamine derivatives. The methyl radical is in the 1 position.

The compounds of this invention are synthesized by alkylating toluenediamine compounds as opposed to the technique of alkylating an aromatic hydrocarbon, e.g., toluene followed by amination through a nitration route. It is because the alkylation is effected on toluenediamine that one obtains a mono-alkyl group having a tertiary carbon atom ortho to an amino group in the aromatic composition. When alkylation is first effected on an aromatic hydrocarbon as opposed to a toluenediamine, the alkyl group is directed to the position para to the methyl group (meta to the amine). Only in the case of European Pat. No. 69,286 where there is at least two alkyl (methyl) groups can one obtain an composition having an alkyl group ortho to an amino group. On the other hand, the amine groups in toluenediamine are ortho directing and therefore the mono-alkyl group becomes ortho to an amino group.

Although much of the art in the manufacture of alkylated aromatic diamines uses a homogeneous catalyst system, e.g. aluminum based catalyst, such techniques have not been particularly adaptable for the manufacture of the 1-methyl-5-tert-alkylphenylene-2,4-diamine or 1-methyl-3-tert-alkylphenylene-2,6-diamine compositions. Presumably, many of the homogeneous catalyst systems do not have sufficient acidity or reactivity to permit the introduction of the tert-alkyl group on the aromatic ring.

The art has utilized heterogeneous catalyst systems to effect alkylation of aromatic amines and examples of these catalytic systems include silica-alumina, montmorillonite, crystalline molecular sieves and zeolites. Of these, crystalline zeolites and crystalline molecular sieves appear to offer advantages in that they have desired acidity and they can accommodate selective production of the mono-tert-alkyltoluenediamine product. Crystalline zeolites are well known and basically are alumino-silicates where the mole ratio of silica to alumina is very high, e.g., greater than 3:1. Such zeolites can be substituted with various cations to alter their acidity and thus their activity with respect to achieving alkylation of toluenediamine. These cations can also alter the effective pore size of the zeolite and thus alter their catalytic activity. Two common types of zeolites are the X zeolite and the Y zeolite with the Y zeolite typically having a higher silica content. Typically a Y zeolite will have a silica to alumina molar ratio of about 3:1. Although the X and Y zeolites are common examples of zeolites suited for practicing the invention, others include faujasite, offretite, chabazite, K, L, omega, and the ZSM family. The Y zeolite or faujasite because of its silica to alumina ratio and pore configuration is well suited for the production of many mono-tert-alkyltoluenediamine products. This is particularly true with respect to the reaction of isobutylene with toluenediamine to produce mono-tert-butyltoluenediamine.

As noted, the acidity of zeolites can be controlled by utilizing various cations in place of the sodium atom in a synthetic or naturally occurring zeolite. The preferred cations suited for the catalyst system include the rare earth metals, such as, lanthanum, cerium, praseodymium, as well as various transition metals and hydrogen. Basic metal exchanged zeolites, which render the resulting zeolite weekly acidic, are relatively inactive. Alkali metals, in particular, decrease the reactivity of the exchanged zeolite. For this reason the highly or strongly acidic zeolites, i.e., hydrogen, rare earth metal exchange or those with a high silica to alumina ratio are preferred.

The pore size of zeolites has an influence on the reactivity and type of products produced. They may be altered toward either larger or smaller sizes by variety of known means. For example, it is known that pore sizes may be reduced by chemical modification, e.g. addition of oxides of boron and phosphorus, or coke formation. It is therefore possible to render many zeolitic systems capable of synthesizing products having larger molecular sizes by increasing the effective pore size of the zeolite from that in its unaltered state. The primary method of enlarging pore size is through removing alumina from the catalyst structure. Some of the main techniques for removing alumina are hydrothermal treatment (steaming) and acid washing. Thus, a zeolite which may have insufficient pore size to accommodate entry of the molecules for reaction may be expanded to have an effective pore size that will accommodate entry of such molecules. Alternatively, if the pore size is too large and substantial amounts of the di-tert-alkylated-toluenediamine products for example are generated, one can reduce the effective pore size of the zeolite by the introduction of large metal cations. However, the preferred technique is to select a zeolite having a smaller effective pore size to limit synthesis of the products having larger molecule sizes.

The mono-tert-alkyltoluenediamines are prepared by reacting an olefin with toluenediamine in the presence of an acidic acid catalyst as described. Examples of olefins for producing a toluenediamine derivative having a tertiary-carbon atom include isobutylene, isoamylene, 2-ethyl-1-pentene, 2-ethyl-2-pentene, 2-methyl-1-pentene, 2-methyl-2-pentene, isooctene, and 1-methylcyclohexene. The relationship of the branched chain and olefin must be such that a tertiary carbon is available for alkylation. In this way $R_1$, $R_2$ and $R_3$ can have from 1 to 3 carbon atoms or $R_2$ and $R_3$ can be combined to form a 5 or 6 membered ring.

Ring alkylation of the 2,4- and 2,6- and the 2,3- and 3,4-vicinal toluenedimines is effected by reacting the toluenediamine with the olefin or olefin precursor such as a tertiary-alkanol. In the case where the olefin is generated from an olefin precursor such as an alcohol, it is believed that such olefin is formed, in situ, by a dehydration of the alcohol. Typically, water, which is a by product from such reaction, tends to deactivate the catalytic system and temperature modifications may be required. Typically, where a 1,1-disubstituted olefin is used for the alkylation reaction, temperatures will range from about 100° to 250° C.; preferably, 160° to 200° C. and the pressures will range from about 15 to 2000 psig and generally in the range of 100 to 1000 psig. It is common practice to alter the temperature and pressure within the above ranges specified to optimize the selectivity and conversion to the desired product. Mole ratios of olefin to toluenediamine used in the reaction will range from about 1 to 10:1 and the reaction time will generally be from about 2 to 48 hours. Where fixed bed catalytic reactors are used, the feed to the reactor, expressed as an LHSV, will range from about 0.05–6 hours$^{-1}$.

The alkylated amines may be used by themselves, as a blend, e.g. a mixture of the 2,4- and 2,6-isomers, respectively, and the isomers may be used in combination with other aromatic diamines and alkylated diamines. A mixture of the 2,4-isomer and 2,6-isomer in a weight ratio of from about 65–80% of the 2,4, 20–35% of the 2,6-isomer and optionally 0–5% of the vicinal isomers is attractive for a number of reasons. One reason is that a commercial feedstock of toluenediamine after separation of the vicinal toluenediamine typically contains about 80% of the 2,4-isomer and 20% of the 2,6-isomer. Another commercial route to toluenediamine produces an isomer ratio of about 65% of the 2,4- and 35% of the 2,6-isomer. The mixture can be alkylated in the same manner as the individual isomers. A second reason is that the mixture of isomers in a weight ratio of from 65–80% of the 2,4-isomer and 20–35% of the 2,6-isomer is advantageous for RIM manufacture as the small amount of the 2,6-isomer extends the reaction time sufficiently to permit the molding of larger and more complex or intricate parts than when using the 2,4-isomer alone. In addition, the 80/20 mixture is a liquid which permits greater flexibility in handling the formulation of the urethane.

The following examples are provided to illustrate embodiments of the invention for synthesizing the alkylated aromatic amines and to illustrate performance of these alkylated amines in the manufacture of polyurethane resins.

EXAMPLE 1

Synthesis of 3-tert-butyl-2,6-toluenediamine

Synthesis of the above recited ortho-tert-butyltoluenediamine (hereinafter t-butyl TDA) was carried out in a 1 gallon stainless steel pressure vessel equipped with a mechanical stirrer. The vessel was charged with a 150 gram portion of a powdered commercially available silica-alumina catalyst containing 13% alumina and 1500 grams (12.24 moles) of 2,6-toluenediamine. The autoclave was sealed and purged with nitrogen. A residual blanket of nitrogen was left in the autoclave, leaving the pressure at 16 psig. The contents of the reactor were heated to a temperature of 200° C. with constant agitation. Isobutylene was then introduced into the reactor and 870 grams or 15.5 moles were added over a 30 minute period resulting in an initial reaction of pressure of 970 psig. This provided a mole ratio of 1.26:1 isobutylene to toluenediamine. The reaction mixture was maintained at 200° C. for about 45 hours with constant agitation.

At the end of the 45 hour reaction time the contents were cooled to about 150° C. and agitation discontinued. The reactor then was vented and the contents removed from the reactor. The catalyst was removed from the reaction mixture by filtration.

The reaction product was analyzed by gas chromatographic techniques and the following analysis was obtained:

|  | Mole Percent |
| --- | --- |
| 2,6-toluenediamine | 43.34 |
| 2-(tert-butylamino)-6-aminotoluene | 3.30 |
| 3-tert-butyl-2,6-toluenediamine | 42.36 |
| 3,5-di-tert-butyl-2,6-toluenediamine | 8.6 |
| 2-(tert-butylamino)-5-tert-butyl-6-aminotoluene | 1.82 |

Both the mono and di-tert-butyltoluenediamine products were produced.

EXAMPLE 2

Synthesis of 5-t-butyl-2,4-toluenediamine

A 300 cc Hastalloy C pressure vessel equipped with a mechanical stirrer was used for producing t-butyltoluenediamine. Approximately 100 grams or 0.819 moles of 2,4-toluenediamine were charged to the vessel along with 5 grams of 36% aqueous hydrochloric acid. The vessel was sealed and purged with nitrogen, leaving a 33 psig nitrogen blanket. The vessel contents then were heated to 180° C. with continuous stirring. Isobutylene then was introduced into the reactor and 53.4 grams or 0.06 moles were added over 15 minutes. On addition of the isobutylene, the pressure in the reactor increased to 766 psig. The reaction mixture was maintained at 180° C. for 24 hours with constant stirring. At the end of the 24 hour period the pressure had dropped to 524 psig. The contents were then cooled to 160° C. and stirring discontinued. At that time the reactor was vented and the reaction product analyzed for composition.

|  | Mole Percent |
| --- | --- |
| 2,4-toluenediamine | 50.70 |
| 2-(tert-butylamino)-4-aminotoluene | 1.84 |
| 2-amino-4-(tert-butylamino)toluene | 12.71 |
| 5-tert-butyl-2,4-toluenediamine | 26.71 |
| 2,4-di(tert-butylamino)toluene | 1.31 |
| 2-(tert-butylamino)-5-tert-butyl-4-aminotoluene | 5.28 |
| 2-amino-5-tert-butyl-4-(tert-butylamino)toluene | 1.45 |

EXAMPLE 3

The procedure of Example 1 was followed to produce t-butyltoluenediamine by using 15 grams of powdered montmorillonite clay in place of the silica-alumina catalyst and using 150 g (1.23 moles) of the 2,4-toluenediamine isomer as opposed to the 2,6-isomer. As in Example 1, the reaction contents were purged with nitrogen and then the contents were heated to 180° C. with stirring. Approximately 278 grams or 4.95 moles of isobutylene were then added to the reaction mixture over 20 minutes. The initial reaction pressure increased to 1210 psig and the contents maintained at 180° C. for 23 hours. At that time the contents were cooled to 150° C. and the reactor vented. The catalyst then was removed by hot filtration.

The reaction product was analyzed and contained the following:

|  | Mole Percent |
| --- | --- |
| 2,4-toluenediamine | 57.82 |
| 2-(tert-butylamino)-4-aminotoluene | 5.49 |
| 2-amino-4-(tert-butylamino)toluene | 18.27 |
| 5-tert-butyl-2,4-toluenediamine | 16.85 |
| 2,4-di(tert-butylamino)toluene | 0.42 |
| 2-(tert-butylamino)-5-tert-butyl-4-aminotoluene | 0.47 |
| 2-amino-5-tert-butyl-4-(tert-butylamino)toluene | 0.27 |

EXAMPLE 4

Alkylation of a 80:20 Mixture of the 2,4- and 2,6-isomers of toluenediamine with Isobutylene over H-Y zeolite A 15.0 g. portion of H-Y zeolite (powder) 120.0 g. (0.98 mol) of 2,4-toluenediamine, and 30.0 g. (0.25 mol) of 2,6-toluenediamine were charged to a 1000 cc Hastalloy C pressure vessel equipped with a mechanical stirrer. The vessel was sealed and purged with nitrogen, leaving a 217 psig nitrogen blanket. The contents were heated to 180° C. with stirring. Isobutylene (280 g., 4.98 mol) was then added over 15 minutes, resulting in an initial reaction pressure of 1271 psig. The reaction mixture was maintained at 180° C. for 18 hours with constant stirring and then cooled to 150° C. Stirring was discon-tinued at this time and the residual pressure was vented. Upon removal of the catalyst by hot filtration, a product mixture of the following composition was obtained:

|  | Mole % |
|---|---|
| 2,4-toluenediamine | 19.09 |
| 2,6-toluenediamine | 6.30 |
| 2-(tert-butylamino)-4-aminotoluene | 2.03 |
| 2-amino-4-(tert-butylamino)toluene | 8.11 |
| 5-tert-butyl-2,4-toluenediamine | 48.79 |
| 3-tert-butyl-2,6-toluenediamine | 12.73 |
| 2-(tert-butylamino)-5 tert-butyl-4-aminotoluene | 1.60 |
| 2-amino-5-tert-butyl-4-(tert-butylamino)toluene | 0.55 |
| 2-(tert-butylamino)-5-tert-butyl-6-aminotoluene | trace |
| 3,5-di-tert-butyl-2,6-toluenediamine | 0.81 |

These results show that H-Y zeolite was extremely effective in producing mono tert-butyltoluenediamine. There was a minor amount of N-butylated toluenediamine produced but this product is suited for recycle and conversion to ring alkylated product. Only a small percent, e.g., about 3% of ditertiary butyltoluenediamine products (including ring and N-alkylated) were produced while conversion was about 70%.

EXAMPLE 5

Preparation of 5-tert-butyl-2,4-toluenediamine

A 15.0 g. portion of powdered H-Y zeolite and 150.0 g. (1.23 mol) of 2,4-toluenediamine were charged to a 1000 cc. Hastalloy C pressure vessel equipped with a mechanical stirrer. The vessel was sealed and purged with nitrogen leaving a residual 225 psig nitrogen blanket. The vessel contents were heated to 180° C. with stirring at 500 rpm. Isobutylene (279.0 g., 4.98 mol) was then added over 2 hours, resulting in 1225 psig vessel pressure. This provided a mole ratio of 4.05 isobutylene to 1 mole toluenediamine. The reaction mixture was maintained at 180° C. for 16 hours with constant stirring. The contents were cooled to 150° C. and then stirring was discontinued and the residual pressure vented. Removal of the catalyst by hot filtration afforded the following product mixture:

|  | Mole % |
|---|---|
| 2,4-toluenediamine | 15.59 |
| 2-(tert-butylamino)-4-aminotoluene | 1.66 |
| 2-amino-4-(tert-butylamino)toluene | 8.02 |
| 5-tert-butyl-2,4-toluenediamine | 71.60 |
| 2,4-di(tert-butylamino)toluene | 0.20 |
| 2-(tert-butylamino)-5-tert-butyl-4-aminotoluene | 1.38 |
| 2-amino-5-tert-butyl-4-(tert-butylamino)toluene | 0.55 |

EXAMPLE 6

Preparation of 3-tert-butyl-2,6-toluenediamine

A 15.0 g. portion of powdered H-Y zeolite catalyst and 140.0 g. (1.15 mol) of 2,6-toluenediamine were charged to a 1000 cc Hastalloy C pressure vessel equipped with a mechanical stirrer as was done in Example 2. The vessel was sealed and purged with nitrogen leaving a residual 200 psig nitrogen blanket at room temperature. The contents were heated to 180° C. with stirring. Isobutylene (267 g., 4.76 mol) was then added to the reaction mixture over 20 minutes, resulting in an initial reaction pressure of 1100 psig. This provided a molar ratio of 4.1:1 isobutylene to toluenediamine. The reaction mixture was maintained at 180° C. for 39 hours with contact stirring. The reaction product was isolated by the procedure used in Example 1 and consisted of the following composition:

|  | Mole % |
|---|---|
| 2,6-toluenediamine | 30.48 |
| 2-(tert-butylamino)-6-aminotoluene | 9.79 |
| 3-tert-butyl-2,6-toluenediamine | 56.13 |
| 2-(tert-butylamino)-5-tert-butyl-6-aminotoluene | 1.19 |
| 3,5-di-tert-butyl-2,6-toluenediamine | 1.28 |

The results in terms of conversion and selectivity were similar to those obtained for the conversion of the 2,4-isomer in Example 5. A lesser quantity of di-tert-butylated product can be produced at slightly lower conversion. Conversion was in excess of 70% and selectivity to ditertiary butyl isomers less than 4%.

EXAMPLE 7

A series of alkylation products was prepared in accordance with the general procedures outlined in Examples 1–6 using various catalyst systems under a variety of conditions. These reactions A–L are set forth in Table 1. For convenience the term alkyl has been used in describing specific alkylated products designated in the product distribution portion of the table.

Alkylation of 2,6-toluenediamine with di- and trisubstituted Olefins

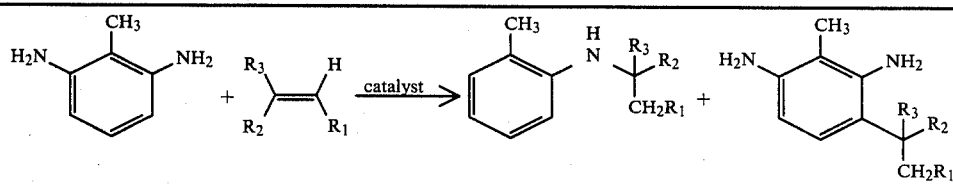

-continued

Alkylation of 2,6-toluenediamine with di- and trisubstituted Olefins

| Entry | A | B | C | D |
|---|---|---|---|---|
| olefin | 2-methyl-2-butene | 2-methyl-2-butene | 2-methyl-2-butene | 2-methyl-2-butene |
| catalyst | 12M HCl | 18M $H_2SO_4$ | 13% $Al_2O_3$/87% $SiO_2$ | H—Y Zeolite |
| moles olefin/moles amines | 2 | 2 | 2.7 | 2 |
| grams amine/grams catalyst | 10 | 10 | 10 | 10 |
| temperature/Initial Total Pressure | 200° C./750 psig | 200° C./650 psig | 200° C./1690 psig | 180° C./440 psig |
| reaction Time | 20 hr | 23 hr | 22 hr | 19 hr |
| Product Distribution (wt %)* | | | | |
| 2,6-toluenediamine | 83.18 | 81.06 | 89.36 | 90.61 |
| N—tert-alkyl-2,6-toluenediamine | 1.54 | 2.45 | 1.55 | 1.93 |
| 3-tert-alkyl-2,6-toluenediamine | 10.11 | 15.17 | 8.35 | 5.97 |
| di-tert-alkyl-2,6-toluenediamine | 5.17 | 1.32 | 0.74 | 1.49 |

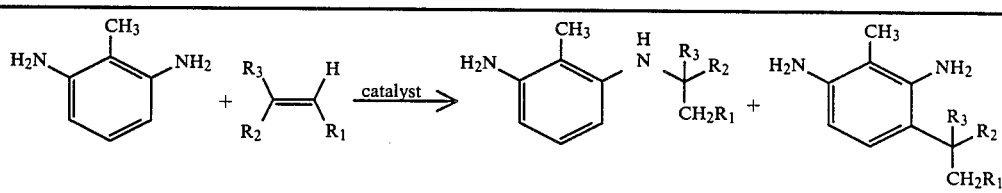

| Entry | E | F | G |
|---|---|---|---|
| olefin | 2-methyl-1-butene | 1-methylcyclopentene | 1-methylcyclohexane |
| catalyst | 13% $Al_2O_3$/$SiO_2$ | 13% $Al_2O_3$/$SiO_2$ | H—Y Zeolite |
| moles olefin/moles amine | 1.74 | 1.48 | 2.0 |
| grams amine/grams catalyst | 12.50 | 10 | 8.13 |
| temperature/Initial Total Pressure | 200° C./602 psig | 200° C./211 psig | 180° C./250 psig |
| reaction Time | 12.5 | 18 hr | 19 hr |
| Product Distribution (wt %)* | | | |
| 2,6-toluenediamine | 80.78 | 75.14 | 99.99 |
| N—tert-alkyl-2,6-toluenediamine | 2.30 | 1.07 | — |
| 3-tert-alkyl-2,6-toluenediamine | 16.07 | 23.58 | trace |
| di-tert-alkyl-2,6-toluenediamine | 0.85 | 0.21 | — |

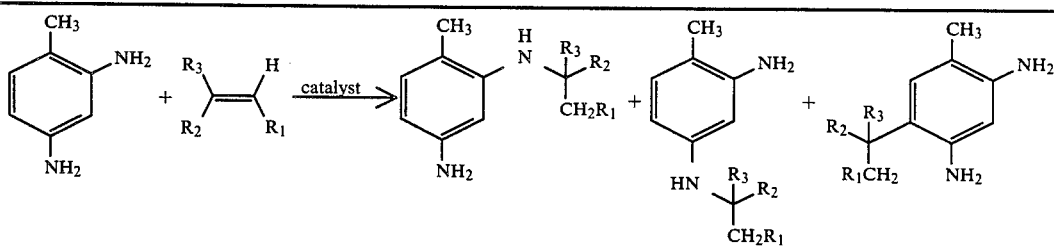

| Entry | H | I | J | K | L |
|---|---|---|---|---|---|
| olefin | 2-methyl-2-butene | 2-methyl-1-butene | 1-methylcyclopentane | 2-methyl-1-pentene | 2,3-dimethyl-1-butene |
| catalyst | H—Y zeolite | 13% $Al_2O_3$/87% $SiO_2$ | 13% $Al_2O_3$/87% $SiO_2$ | 13% $Al_2O_3$/87% $SiO_2$ | 13% $Al_2O_3$/87% $SiO_2$ |
| moles olefin/moles amine | 2 | 1.75 | 1.48 | 2 | 2 |
| grams amine/grams catalyst | 10 | 12.5 | 10 | 15 | 10 |
| temperature/Initial Total Pressure | 180° C./450 psig | 200° C./495 psig | 200° C./187 psig | 198° C./295 psig | 200° C./315 psig |
| reaction time | 22 hr | 19 hr | 22 hr | 24 hr | 96 hr |
| Product Distribution (wt %)* | | | | | |
| 2,4-toluenediamine | 88.45 | 77.89 | 77.86 | 74.45 | 88.76 |
| 2-N—tert-alkyl-2,4-toluenediamine | 1.12 | 1.96 | 0.69 | trace | trace |
| 4-N—tert-alkyl-2,4-toluenediamine | 3.92 | 8.34 | 2.66 | 4.69 | 2.51 |
| 5-tert-alkyl-2,4-toluenediamine | 6.51 | 11.81 | 18.68 | 18.69 | 4.92 |
| di-tert-alkyl-2,4-toluene- | — | — | — | 2.17 | — |

-continued

Alkylation of 2,6-toluenediamine with di- and trisubstituted Olefins diamine $R_1 = C_{1-3}$ alkyl
$R_2 = C_{1-3}$ alkyl
$R_3 = C_{1-3}$ alkyl or combined with $R_2$ to form a 5 to 6 membered ring.
*Analysis performed on an olefin-free sample

EXAMPLE 8

A series of polyurethane-urea elastomers utilizing various chain extenders was prepared and evaluated in a pot life test system for the purpose of determining the reactivity of the chain extenders in standard urethane formulations relative to one another. The polyurethane-urea elastomers were formulated by reacting a prepolymer of poly(1,4-oxytetramethylene)glycol end-capped with 2,4-toluene diisocyanate, the prepolymer having an NCO content generally from 5–7%, with the test candidate chain extender aromatic diamine and a diol. The nominal stoichiometric equivalent ratio of isocyanate to diamine chain extender to diol for each sample is 2:1:1. Commercially, the prepolymer is marketed under the trademark ADIPRENE L-167 by the E. I. duPont de Nemours Company and the poly(ε-caprolactone) diol marketed under the designation CAPA 200 by Interox Chemicals Limited.

The test system for measuring pot life comprised a heated test chamber for holding 7 grams of test sample at a constant temperature (50° C.) and was equipped with a vertical perforated piston. This piston moves up and down through the test sample in timed relationship. (The temperature rise due to the exothermic reaction is discounted.) The force necessary to move the piston through the polymer sample is measured in arbitrary units, and the relationship of the force is plotted as a function of time. The force-pot life relationship of the urethane system during cure then is correlated to known force-viscosity relationships for the urethane-urea systems.

Table 2 represents tabular data providing coefficients for an empirical model expressing the logarithm base 10 of viscosity as a third-power polynomial function of time for several chain extender systems. The coefficients apply to the equation:

$$\log(\text{viscosity}) = I + A(\text{time}) + B(\text{time})^2 + C(\text{time})^3.$$

The coefficient of the first power term ("A") is a "quasi" reaction rate constant measuring initial reactivity. Smaller values in the quasi rate constant (A) indicate longer and desirable pot lives. The value T-5000 is the time in which the reaction product has a relative viscosity of 5000 units. Even though the value is an arbitrary value, that value is relevant for use in determining the performance of the test candidate in a RIM process or cast elastomers process. For injection molding of modest size parts, T-5000 may be about 2.5 minutes; whereas, the molding of large or intricate parts may require a T-5000 of greater than 5 minutes, e.g., 10 to 40 minutes for hand casting.

Figure 2:
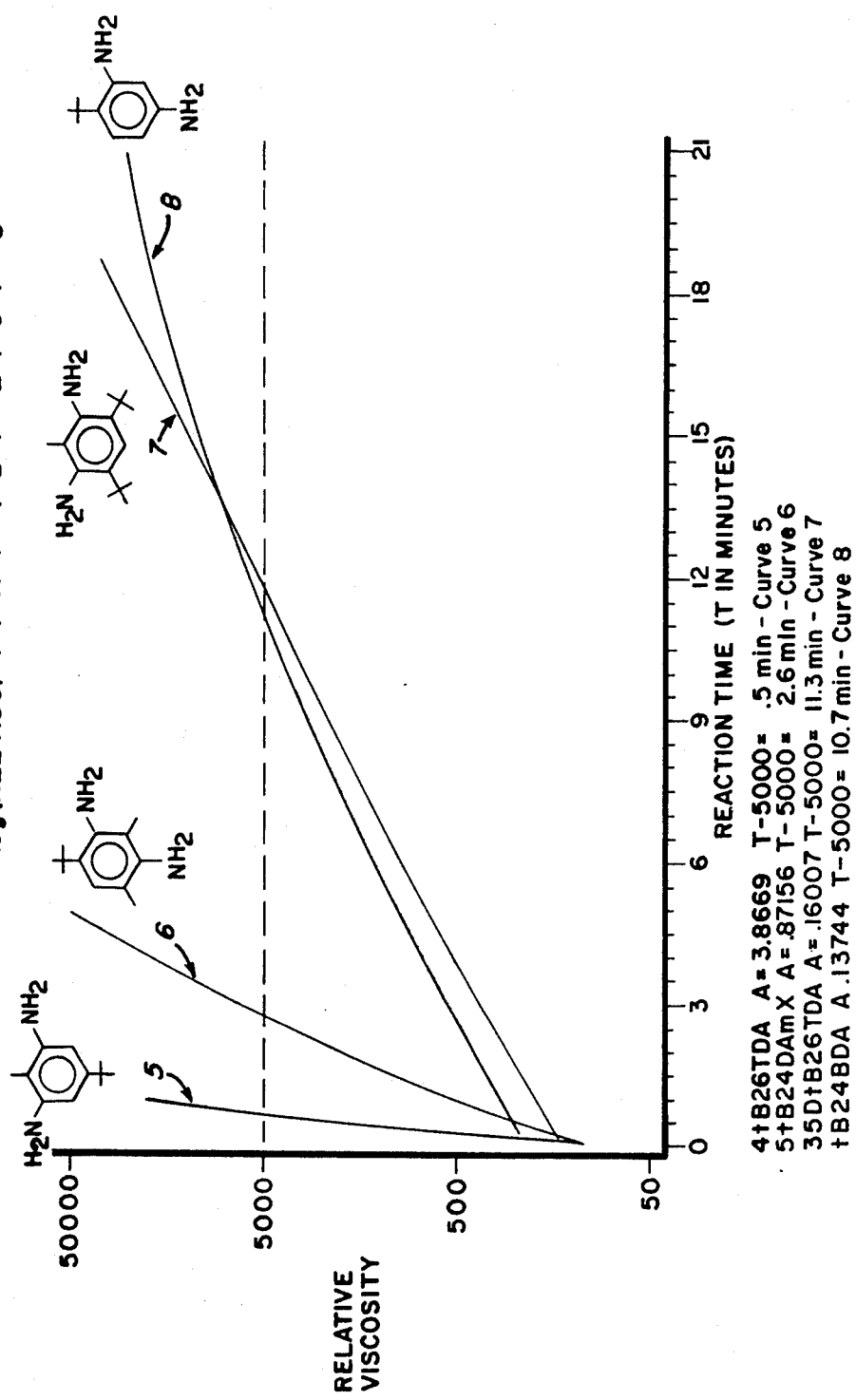
FIG. 2 is a plot of rheological data for prior art and test tertiary butyl toluenediamine candidates expressed as a function of time.

FIGS. 1 and 2 are plots of the results obtained for the test tert-butyltoluenediamine candidates. These graphs show the relative performance of the 2,4- and 2,6-tert-butyltoluenediamine isomers in comparison to other aromatic diamine chain extenders, the 80/20 mix of tBTDA and a di-tert-butyltoluenediamine products. In the first figure the potlife lineshape for the 80/20 commercial mixture of 3,5-diethyl-2,4-toluenediamine/3,5-diethyl-2,6-toluenediamine (Curve 1) is contrasted with the lineshapes obtained for tertiarybutylated toluenediamines. 2,4-TDA monoalkylated in only the 5-position with isobutylene (5tB24TDA) (Curve 2) shows a reactivity comparable to a twice ethylated TDA mixture. Monotertiarybutylated 2,6-TDA, (Curve 4) however, shows a much longer potlife as indicated by the lower "A" term (0.06721 versus 0.8092 for DETDA and 0.7697 for 5tB24TDA) and by the T-5000 value (17.8 min vs 2.2 and 2.2 minutes respectively). The location of substituents about the reacting amine centers determines the relative magnitude of steric rate reduction. The 80/20 mix of 5tB24TDA and 3tB26TDA, (Curve 3) a supercooled liquid with a melting point of 38° C. once crystalline, has a T-5000 nearly 50% greater than an 80/20 mixture of DETDA i.e., 3.2 vs 2.2 minutes. This allows for greater latitude in RIM processing of large or detailed parts using tBTDA.

Counterbalancing steric retardation and electron-donation effects are illustrated in FIG. 2. If a tertiarybutyl group is not ortho to the reacting amine substituent, as is the case for 4-tertiarybutyl-2,6-toluenediamine (curve 5), there is only activation provided by the alkyl group substituent; that potential chain extender prepared by nitration/reduction of paratertiary-butyltoluene reacts very fast, with a T-5000 of only 0.5 minutes, an A term of 3.87.

When 2,6-TDA is ortho-alkylated with isobutylene not once, but twice, the reactivity of 3,5-ditertiarybutyl-2,6-toluenediamine (Curve 7) in our polyurethane/urea formulation increases rather than decreases relative to the mono-ortho-tertiarybutylated product. The T-5000 decreases from 17.8 minutes for the monosubstituted 2,6-TDA to 11.3 minutes for the disubstituted product. The steric blockage around the less reactive amine group in each species is the same (—NH₂ accompanied by —CH₃ and —C(CH₃)₃ nearest neighbors), but in 35DtB26TDA there is the extra electron donation offered by the second —C(CH₃)₃ alkyl group to accelerate reaction. This electronic activation is also demonstrated by contrasting tertiarybutyl-2,4-diaminobenzene (T-5000=10.7 minutes Curve 8) with 5-tertiarybutyl-2,4-diaminometaxylene (5tB24DAmX Curve 6) (T-5000=2.6 minutes). In this substituted xylene the steric retardation noted in 3-tert-butyl-2,6-TDA is overcome by the amine reactivity activation provided by the addition of the second of the two methyl group ring substituents.

Figure 3:
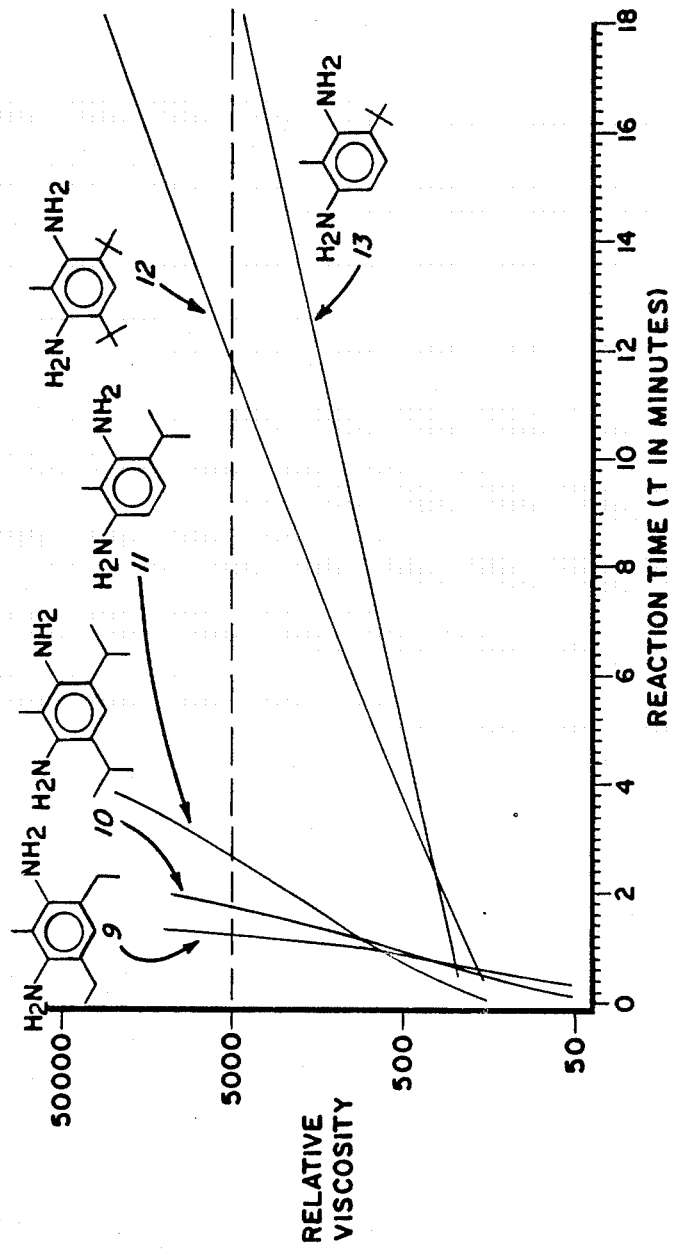
FIG. 3 is a plot of rheological data for alkylated 2,6-toluenediamine chain extenders expressed as a function of time.
Figure 4:
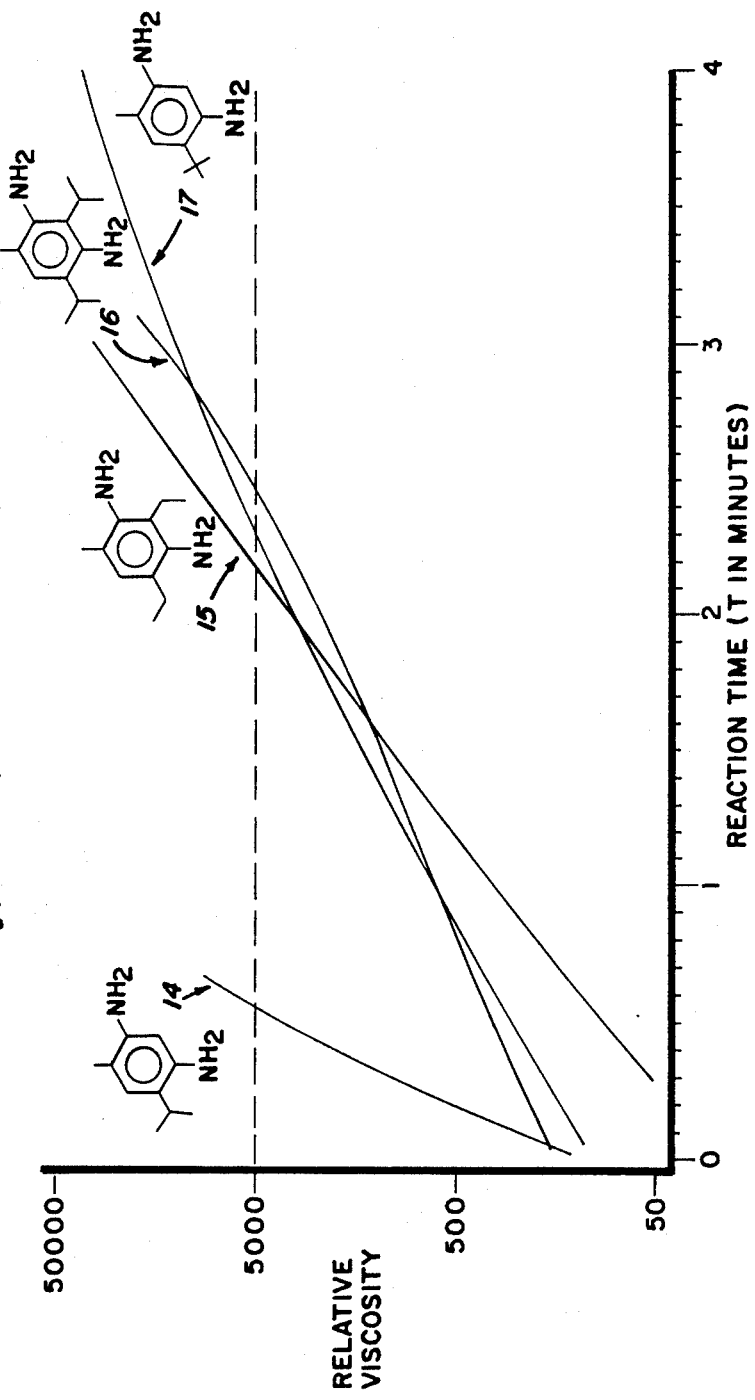
FIG. 4 is a plot of rheological data for alkylated 2,4-toluenediamine expressed as a function of time.

FIGS. 3 and 4 graphing the data in table 3 further detail these ring position substituent effects. For 2,6-toluenediamines the greater steric bulk of the isopropyl group relative to the ethyl group increases potlife from 1.13 to 1.63 minutes (Curves 9, 10). Again, as with 3tB26TDA there is a decrease in reactivity when 2,6-TDA is substituted by one, not two alkyl groups; 3-isopropyl-2,6-TDA (Curve 11) has a potlife of 2.47 minutes, or about 50% greater than for the 3-5-diisopropyl-2,6-TDA (Curve 10). However, the tertiarybutyl group is much more effective on a percentage basis than the isopropyl group in amine deactivation. In FIG. 4 the effects on the 4-amine postion with a t-butyl group as compared to other alkyl substituents are detailed. In curve 14 the 5-isopropyltoluenediamine may be considered a base case to compare with 3,5-diisopropyl-TDA (Curve 16), wherein the 3-position substituent greatly increases the constraints on the reactivity of the 4-position amine. Accordingly, the 3,5-diethyl-2,4-TDA (Curve 15) is slightly more reactive than the diisopropyl isomer. On the other hand, upon tertiarybutylation at a single 5-position substituent one finds that group more decelerating than joint 3-, and 5-position disubstitution. The 3,5-ditertiarybutyl-2,4-toluenediamine has not been made; the steric constraints appear too great.

Figure 5:
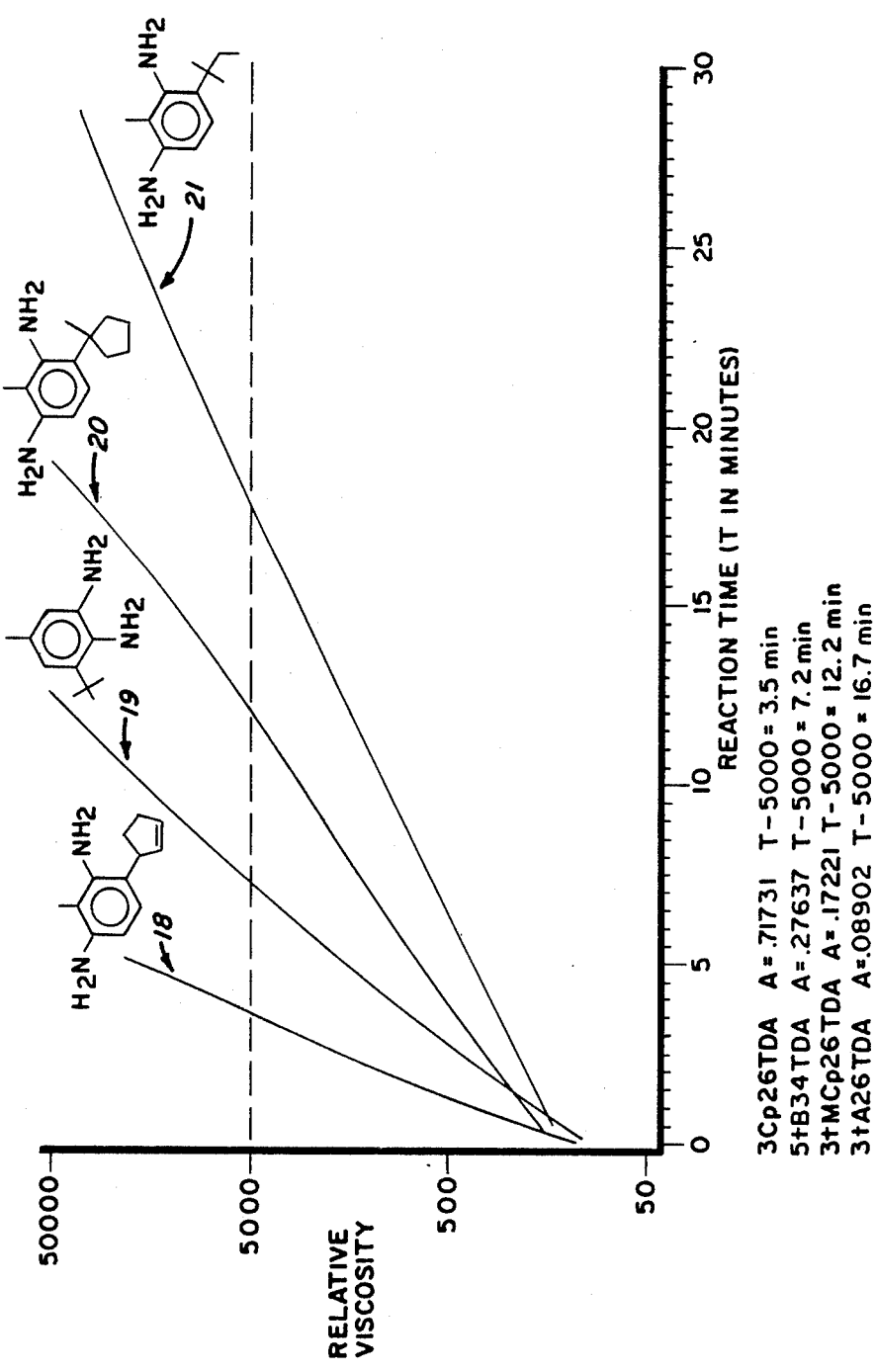
FIG. 5 is a plot of rheological data for a tertiary and non tertiary-alkylated-2,6-toluenediamines expressed as a function of time.

FIG. 5 illustrates the principle of tertiary carbon generality in effecting desirable chain extender reaction rates. Compared to the moderate reactivity of 3-cyclopentenyl-2,6-TDA (T-5000=3.5 min, (Curve 18)) made from cyclopentadiene alkylation of TDA, the tertiary alkyl substituted 3-methylcyclopentyl-2,6-TDA from reaction of methylcyclopentene with 2,6-TDA is much slower (T-5000=12.2 min (Curve 20)). Apparently, the steric bulk of tertiaryamyl-2,6-toluenediamine (Curve 21) made by reacting either 2-methyl-1-butene or 2-methyl-2-butene causes the reaction to be slower still, due to elimination of cyclopentane ring constraint. Also exemplifying the generality that tertiaryalkyl group substantially retards rate is 5-tertiarybutyl-3,4-TDA (T-5000=7.2 min, (Curve 19), which is satisfyingly slow in elastomer preparations.

TABLE 2

Lineshape parameters and T-5000 'pot-life' times for chain extenders are:
Empirical Model of Potlife Data
log (relative viscosity) =
I + A*(time) + B*(time)**2 + C*(time)**3

| Figure # / Curve # // name acronym | I | A | B | C | T-5000 (min) |
|---|---|---|---|---|---|
| 2 / 5 // 4-tertiaryButyl-2,6-toluenediamine | | | | | |
| 4tB26TDA | 1.916 | 3.867 | −3.407 | 2.411 | .54 |
| 4 / 14 // 5-isoPropyl-2,4-toluenediamine | | | | | |
| 5iP24TDA | 2.000 | 3.374 | −.2558 | .7390 | .54 |
| 3 / 9 // 3,5-Diethyl-2,6-toluenediamine | | | | | |
| 35DE26TDA | 0.6392 | 5.572 | −6.941 | 3.829 | 1.13 |
| 3 / 10 // 3,5-Diisopropyl-2,6-toluenediamine | | | | | |
| 35DiP26TDA | 1.620 | 1.563 | −.6099 | .2471 | 1.63 |
| 4 / 15 // 3,5-Diethyl-2,4-toluenediamine | | | | | |
| 35DE24TDA | 1.322 | 1.350 | −.1994 | .03511 | 2.03 |
| 1 / 1 // Diethytoluenediamine (80/20 isomer mix) | | | | | |
| DETDA | 1.889 | .8092 | −.1662 | .06490 | 2.21 |
| 1,4 / 2,17 // 5-tertiaryButyl-2,4-toluenediamine | | | | | |
| 5tB24TDA | 2.029 | .7697 | −.001596 | −.007802 | 2.24 |
| 4 / 16 // 3.5-Diisopropyl-2,4-toluenediamine | | | | | |
| 35DiP24TDA | 2.181 | .7499 | −.1844 | .05207 | 2.42 |
| 2 / 6 // 5-tertiaryButyl-2,4-diaminometaxylene | | | | | |
| 5tB24DAmX | 2.022 | .8716 | −.1255 | .01242 | 2.64 |
| 3 / 11 // 3-isoPropyl-2,6-toluendiamine | | | | | |
| 3iP26TDA | 2.529 | .5074 | −.07123 | .01612 | 2.68 |
| 1 / 3 // tertiaryButyltoluenediamine (80/20 isomer mix) | | | | | |
| tBTDA | 2.132 | .5029 | −.004240 | −.002372 | 3.25 |
| 5 / 18 // 3-Cyclopentenyl-2,6-toluenediamine | | | | | |
| 3Cp26TDA | 1.980 | .7173 | −.1074 | .01145 | 3.52 |
| 5 / 19 // 5-tertiaryButyl-3,4-toluenediamine | | | | | |
| 3tB34TDA | 1.957 | .2764 | −.006243 | .0001337 | 7.24 |
| 2 / 8 // tertiaryButyl-2,4-benzenediamine | | | | | |
| tBBDA | 2.354 | .1374 | −.001311 | −.00002684 | 10.7 |
| 2,3 / 7,12 // 3,5-Ditertiarybutyl-2,6-toluenediamine | | | | | |
| 35DtB26TDA | 2.155 | .1601 | −.003675 | −.0001064 | 11.3 |
| 5 / 20 // 3-tertiaryMethylcyclopentyl-2,6-toluenediamine | | | | | |
| 3tMCp26TDA | 2.134 | .1722 | −.006245 | .0002280 | 12.2 |
| 5 / 21 // 3-tertiaryAmyl-2,6-toluenediamine | | | | | |
| 3tA26TDA | 2.127 | .08902 | .0001249 | −.000008697 | 16.7 |
| 1,3 / 4,13 // 3-tertiaryButyl-2,6-toluenediamine | | | | | |
| 3tB26TDA | 2.358 | .06721 | .0006064 | −.00001838 | 17.8 |

EXAMPLE 9

Cast elastomers wre prepared from the ortho-tertiarybutylated 2,6-toluenediamines whose potlife T-5000 values were above 10 minutes. Conventional hand-mix techniques were used for these chain extenders, MOCA, chlorotoluenediamine and tertiarybutyl-2,4-benzenediamine in combination with Adiprene-167 to prepare a series of molded test plaques whose physical properties were tested and are compared in the table below.

Specifically, the conventional toluenediisocyanate end-capped polytetramethyleneglycol was degassed at 90°-100° C. under partial vacuum. When bubbling ceased the prepolymer was weighed and vigorously mixed with the proper weight of molten aromatic diamine chain extender to give the isocyanate index reported in the table. The resulting mixture was poured into an aluminum mold whose 150×150×1.9 mm cavity was properly pretreated with mold release agent.

After curing under pressure in a 30 ton hydraulic press at 100° C. for two hours the test plaques were demolded, cured in an air oven at 100° C. for 22 hours, then postcured at ambient conditions for seven days before being conditioned for analytical testing by exposure to 23+/−2° C. at 50+/−5% relative humidity for 40 hours. Physical properties were measured in accordance with ASTM procedures. Hardness (ASTM D2240) and tensile (ASTM D1708) measurements are the average of five determination each, tear resistance (ASTM D624, die C) the average of three determinations.

Table 3 provides test data with resect to the physical properties in terms of tensile modulus, tensile strength at break, elongation at break, tear resistance and durometer hardness measured in accordance with ASTM methods. More specifically, the tensile strength at a given elongation and at break was measured in accordance with ASTM D1708; tear resistance according to ASTM D624 (Die C) and durometer hardness according to ASTM D2240;

TABLE 3

| ADIPRENE 167 CAST POLYURETHANES | | | | | |
|---|---|---|---|---|---|
| Chain Extender | MOCA | Cl-TDA | tBBDA | 3tB26TDA | 35DtB26TDA |
| NCO index | 1.05 | 1.04 | 1.05 | .95 | 1.05 |
| Shore A Hardness | 90 | 90 | 93 | 94 | 93 |
| Shore D Hardness | 47 | 39 | 40 | 44 | 43 |
| 100% tensile (psi) | 1680 | 1360 | 840 | 1520 | 1410 |
| 200% tensile (psi) | 2390 | 2080 | 1330 | 2380 | 2310 |
| 300% tensile (psi) | 3320 | 2940 | 2000 | 3440 | 3270 |

TABLE 3-continued

ADIPRENE 167 CAST POLYURETHANES

| | | | | | |
|---|---|---|---|---|---|
| Ratio 300/100 tensile | 1.98 | 2.16 | 2.38 | 2.26 | 2.32 |
| break tensile (psi) | 4840 | 3050 | 5180 | 5490 | 6540 |
| % elongation (%) | 440 | 320 | 630 | 480 | 620 |
| tear resistance (pli) | 700 | 530 | 490 | 660 | 720 |

MOCA = methylenebis(orthochloro-aniline)
Cl-TDA = chlorotoluenediamine
tBBDA = tertiarybutyl-2,4-benzenediamine
3tB26TDA = 3-tertiarybutyl-2,6-toluenediamine
35Dt26TDA = 3,5-ditertiary butyl-2,6-toluenediamine
These data show that the percent elongation for the t-butyl toluenediamine systems are superior to MOCA and Cl-TDA and the tear resistance superior to Cl-TDA and tBBDA.
DETDA and the 2,4-tBTDA isomer were too reactive to be used in preparing cast elastomers.

EXAMPLE 10

RIM ELASTOMER USE

Reaction injection molded elastomers were prepared using a model SA8-20 laboratory machine (LIM Kunststoff Technologie Gmbh, Kittsee, Austria) suitable for processing two component mixtures. 10-30 cc/min metering pumps for components "A" (methylenediphenyldiisocyanate, MDI) and "B" (polyol plus chain extender plus catalysts) are driven synchronously by sprocket wheels in proportion to the mixture to be processed by means of a variable speed (50-250 rpm) motor. Any desired mixing ratio may be established by changing gears. Components A and B are conveyed into a mixing chamber by individually controlled compressed air actuated valves. A high speed rotor, coninuously adjustable from 10,000 to 18,000 rpm using a frequency transformer, mixes the components. The pump block and mixing head are movable, and may be automatically advanced to a stationary mold by compressed air. A replaceable 'O' ring accomplishes a seal between mixing the head and mold.

A series of polyurethane-urea elastomers from commercial modified liquid methylene diphenyldiisocyanate (MDI) reaction with moderate molecular weight (1000-3000 equivalent wt) triols supplemented with aromatic diamine has been made. Data in which 80/20 isomer mixtures of 3,5-diethyl-2,4-toluenediamine/3,5-diethyl-2,6-toluenediamine and 80/20 5-tertiarybutyl-2,4-toluenediamine/3-tertiarybutyl-2,6-toluenediamine are reacted with various triols using the same isocyanate, Isonate 181 from Upjohn Corp., are given in Table 4. The isocyanate index of 1.05 was sought for all elastomers and checked by machine 'calibration shots' of unmixed, unreacted A and B components through the model SA8-20 sampling ports designed for this purpose. Stream temperatures were set by controlled circulation of thermostatted water through the double walled A and B reservoirs, the mixing block temperature by electrical resistance heaters. Molds were thermostatted before mounting on a jig to which the mixing head was conveyed during the injection molding operation. 200×200×2 and 200×200×3 mm cavities in nominally 26×27×4 cm aluminum molds were treated with mold release agents before each injection. After injection the mixing rotor was washed in situ with dioctylphthalate, blown clean with nitrogen and readied for the next injection shot as the mold was unmounted and opened. Test plaques were cured for 12 hours at 60° C., freed of mold release agent, and properly conditioned for replicate hardness, tensile and tear tests on 2 mm thick pieces as noted above for cast elastomers. The additional variable of yield tensile is reported for the crosslinked RIM elastomers due to the characteristic shape of the Instron stress-strain curve. Also tabulated are flexural modulus and maximum stress (ASTM D1708) determined on each of five 1"×3" specimens from the 3 mm plaques and sag, a measure of thermal stability (ASTM D3769) measured on a 100 mm overhang using 3 mm thick plaque samples.

From Table 4 it can be seen the tBTDA RIM elastomers are more extensible (lower stress at the same strain), show greater ultimate elongation and lower thermal stability than DETDA RIM elastomers. The contribution to physical properties from the individual tertiarybutylated toluenediamine isomers is revealed in the Table (5). The data presented for 0.95 and 1.05 isocyanate show that 3-tertiarybutyl-2,6-toluenediamine appears to more significantly contribute to thermal instability than does 5-tertiarybutyl-2,4-toluenediamine. The tensile at break and ultimate % elongation are also inferior for 3tB26TDA, the less symmetric of the two isomers.

TABLE 4

URETHANE FORMULATIONS

| CHAIN EXTENDER | DETDA | tBTDA | DETDA | tBTDA | DETDA | tBTDA | DETDA | tBTDA |
|---|---|---|---|---|---|---|---|---|
| CH_EX pph | 25 | | 25 | | 25 | | 22 | |
| POLYOL | VORANOL 5148 | | NIAX 11-27 | | FOMREZ A-1228 | | VORANOL 5815 | |
| ISOCYANATE | ISONATE 181 | | ISONATE 181 | | ISONATE 181 | | ISONATE 181 | |
| NCO index | 1.05 | 1.04 | 1.05 | 1.04 | 1.05 | 1.04 | 1.04 | 1.04 |
| Catalyst_1 | 33-LV | 33-LV | — | 33-LV | 33-LV | 33-LV | 33-LV | 33-LV |
| Cat_1 pph | .063 | .063 | — | .125 | .050 | .050 | .050 | .050 |
| Catalyst_2 | T-12 | T-12 | T-12 | T-12 | T-12 | T-12 | T-12 | T-12 |
| Cat_2 pph | .063 | .063 | .125 | .125 | .050 | .050 | .050 | .050 |
| A Stream temp °C. | 39.9 | 41.4 | 42.9 | 42.8 | 39.3 | 42.4 | 40.8 | 44.6 |
| B Stream temp °C. | 39.3 | 45.6 | 41.0 | 40.0 | 45.1 | 41.0 | 44.6 | 40.8 |
| Mixing head temp °C. | 39.6 | 39.9 | 39.9 | 40.3 | 40.2 | 40.1 | 40.6 | 40.6 |
| 2 mm Shot time (sec) | 2.35 | 2.48 | 2.78 | 2.82 | 2.66 | 2.59 | 2.42 | 2.69 |
| 3 mm Shot time (sec) | 2.06 | 3.35 | 3.35 | 3.49 | 3.30 | 3.33 | 3.16 | 3.35 |
| Shore A Hardness | 98 | 96 | 96 | 97 | 98 | 98 | 96 | 97 |
| Shore D Hardness | 64 | 64 | 61 | 66 | 63 | 65 | 55 | 59 |
| 100% tensile (psi) | 2060 | 1840 | 2000 | 1720 | 2220 | 1950 | 1850 | 1530 |
| 200% tensile (psi) | 2650 | 2180 | 2400 | 1880 | 2820 | 2390 | 2370 | 1950 |

TABLE 4-continued

URETHANE FORMULATIONS

| | | | | | | | | |
|---|---|---|---|---|---|---|---|---|
| 300% tensile (psi) | 3290 | 2720 | 2860 | 2130 | 3580 | 3000 | 3000 | 2500 |
| yield tensile (psi) | 2040 | 2020 | 1980 | 1960 | 2210 | 2160 | 1660 | 1660 |
| break tensile (psi) | 3840 | 3740 | 3520 | 2720 | 3700 | 3740 | 3470 | 3550 |
| % elongation (%) | 340 | 450 | 440 | 530 | 320 | 430 | 370 | 480 |
| tear resistance (pli) | 760 | 680 | 740 | 710 | 770 | 740 | 680 | 630 |
| maximum stress (psi) | 2210 | 2330 | 2070 | 2510 | 2210 | 2180 | 1680 | 1740 |
| flexural modulus (psi) | 46500 | 47000 | 44100 | 55500 | 46300 | 46000 | 35800 | 35900 |
| sag (125° C., 1 hr) (in) | .89 | 1.33 | .72 | 1.08 | .57 | 1.26 | .64 | 1.28 |

Glossary
DETDA = diethyl toluenediamine 80/20
tBTDA = tert butyl toluenediamine 80/20
Voranol 5148 = Dow polyether polyol
Isonate 181 = Upjohn methylenediphenyl diisocyanate
Niax 11-27 = Union Carbide polyether polyol
FOMREZ A-1228 = Witco polyether polyol
Voranol 5815 = Dow polyether polyol
33-LV = Air Products and Chemicals, Inc. triethylene diamine in dipropylene glycol
T-12 = M&T Chemicals dibutyl tin dilaurate
pph = weight parts chain extender or catalyst per hundred parts polyol

TABLE 5

URETHANE FORMULATIONS
80/20 mix

| CHAIN EXTENDER | DETDA | | tBTDA | | 5tB24TDA | | 3tB26TDA | |
|---|---|---|---|---|---|---|---|---|
| CH_EX pph | 22 | | 22 | | 22 | | 22 | |
| POLYOL | VORANOL 5815 | | VORANOL 5815 | | VORANOL 5815 | | VORANOL 5815 | |
| ISOCYANATE | ISONATE 181 | | ISONATE 181 | | ISONATE 181 | | ISONATE 181 | |
| NCO index | .94 | 1.04 | .94 | 1.04 | .93 | 1.06 | .96 | 1.04 |
| Catalyst_1 | 33-LV | 33-LV | 33-LV | 33-LV | 33-LV | 33-LV | 33-LV | 33-LV |
| Cat_1 pph | .050 | .050 | .050 | .050 | .050 | .050 | .050 | .050 |
| Catalyst_2 | T-12 | T-12 | T-12 | T-12 | T-12 | T-12 | T-12 | T-12 |
| Cat_2 pph | .050 | .050 | .050 | .050 | .050 | .050 | .050 | .050 |
| A Stream temp °C. | 40.6 | 40.8 | 40.6 | 44.6 | 43.6 | 46.6 | 45.0 | 47.3 |
| B Stream temp °C. | 41.6 | 44.6 | 44.0 | 40.8 | 58.7 | 61.9 | 65.0 | 57.6 |
| Mixing head temp °C. | 40.2 | 40.6 | 40.4 | 41.2 | 40.4 | 40.1 | 41.0 | 40.6 |
| 2 mm Shot time (sec) | 2.33 | 2.42 | 2.42 | 2.69 | 2.46 | 2.58 | 2.41 | 2.55 |
| 3 mm Shot time (sec) | 3.27 | 3.21 | 2.96 | 3.35 | 3.11 | 3.29 | 3.03 | — |
| Shore A Hardness | 96 | 96 | 98 | 97 | 97 | 97 | 97 | 97 |
| Shore D Hardness | 52 | 55 | 56 | 59 | 59 | 60 | 58 | 60 |
| 100% tensile (psi) | 1460 | 1850 | 1250 | 1520 | 1320 | 1570 | 1420 | 1720 |
| 200% tensile (psi) | 1770 | 2370 | 1540 | 1940 | 1650 | 2000 | 1750 | 2180 |
| 300% tensile (psi) | 2110 | 3000 | 1910 | 2480 | 2080 | 2540 | 2130 | 2760 |
| yield tensile (psi) | 1360 | 1660 | 1440 | 1650 | 1520 | 1720 | 1650 | 1910 |
| break tensile (psi) | 2720 | 3470 | 2790 | 3530 | 3150 | 3630 | 2560 | 2920 |
| % elongation (%) | 470 | 370 | 530 | 480 | 540 | 490 | 410 | 340 |
| tear resistance (pli) | 600 | 680 | 600 | 630 | 590 | 660 | 600 | 650 |
| maximum stress (psi) | 1340 | 1680 | 1330 | 1740 | 1100 | 1370 | 1160 | 1600 |
| flexural modulus (psi) | 28500 | 35800 | 27400 | 35900 | 22200 | 26900 | 23600 | 30300 |
| sag (125° C., 1 hr) (in) | .85 | .64 | 1.96 | 1.28 | 1.46 | 1.02 | 2.68 | 2.11 |

Glossary
DETDA = diethyl toluenediamine 80/20
tBTDA = tert butyl toluenediamine 80/20
Isonate 181 = Upjohn methylenediphenyl diisocyanate
Voranol 5815 = Dow polyether polyol
33-LV = Air Products and Chemicals, Inc. triethylene diamine in dipropylene glycol
T-12 = M&T chemicals dibutyl tin dilaurate
pph = weight parts chain extender or catalyst per hundred parts polyol

EXAMPLE 11

A series of chain extenders was tested in the Ames mutagenic assay using five strains of Salmonella bacteria without (−) and with (+) metabolic activation. Table 6 provides the results of various test compounds including a variety of known aromatic diamine chain extenders against these five strains of Salmonella bacteria. The data are presented as the quantity of test compound in micrograms per test plate that gave positive mutagencity results.

TABLE 6

| | Strain TA1537 | | Strain TA1537 | | Strain TA1538 | | Strain TA98 | | Strain TA100 | |
|---|---|---|---|---|---|---|---|---|---|---|
| Test Compound | (−) | (+) | (−) | (+) | (−) | (+) | (−) | (+) | (−) | (+) |
| 1 Chlorotoluenediamine (mixed isomers) | 500 | 50 | — | 5000 | — | 500 | — | 500 | — | 500 |
| 2 Diethyltoluenediamine (mixed isomers) | — | — | — | — | — | 1666 | — | 500 | — | 5000 |
| 3 tertiary-butyl-2,4-diaminobenzene | — | — | — | — | — | 1200 | — | 1800 | — | — |
| 4 5-tertiary-butyl-2,4-diaminotoluene | — | — | — | — | — | — | — | — | — | — |
| 5 3-tertiary-butyl-2,6- | — | — | — | — | — | — | — | — | — | — |

TABLE 6-continued

| Test Compound | Strain TA1537 (−) | Strain TA1537 (+) | Strain TA1537 (−) | Strain TA1537 (+) | Strain TA1538 (−) | Strain TA1538 (+) | Strain TA98 (−) | Strain TA98 (+) | Strain TA100 (−) | Strain TA100 (+) |
|---|---|---|---|---|---|---|---|---|---|---|
| diaminotoluene | | | | | | | | | | |
| 6 3,5-ditertiary-butyl-2,6-diaminotoluene | — | — | — | — | — | 50 | — | 15 | — | 50 |

From Pharmakon Research International, the Ames test data evaluation criteria in Table 5 are clearly defined: "In most tests with the Salmonella/Microsome Assay, results are either clearly positive or clearly negative. A positive result is defined as a reproducible, dose-related increase in the number of histidine-independent colonies. This dose-response relationship occasionally necessitates slight modification of the original doses in a repeat assay. If the historical control is within one standard deviation of the historical mean and the test chemical produces the highest increase equal to or greater than three times the solvent control value, the test chemical is considered positive. A negative result is defined as the absence of a reproducible increase in the number of histidine-independent colonies."

The above Table 5, as well as from evidence obtained with respect to prior art chain extenders, shows chlorotoluenediamine and diethyltoluenediamine are Ames positive. Both isomers of mono-tBTDA are Ames negative and thus provide processing advantages to urethane formulators. The 3,5-ditertiary-butyl-2,6-diaminotoluene was shown to be Ames positive even though some of the bacteria were not affected. Because of the low values recorded, it is believed the data may be in error. Therefore, the data may not be an actual reflection of the inherent properties of the 3,5-ditertiary-butyl-2,6-diaminotoluene.

Ames test data for other tert-alkyl-substituted toluenediamines should have a negative Ames value in view of the fact there is only one tert-alkyl group and the reactivity of the tert-alkyl-substituted toluenediamine in polyurethane is highly similar to mono-tert-butyl-toluenediamine.

What is claimed:

1. A toluenediamine composition having an alkyl substituent having a tertiary carbon atom represented by the formula:

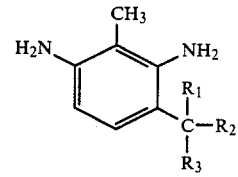

wherein $R_1$, $R_2$ and $R_3$ are $C_{1-3}$ alkyl groups or $R_2$ and $R_3$ are combined to form a $C_{5-6}$ membered ring.

2. The composition of claim 1 wherein said composition is 2,6-diamino-3-tert-butyltoluene.

3. The composition of claim 1 wherein the composition contains approximately 80% by weight of 2,4-diamino-5-tert-butyltoluene and 20% by weight of 2,6-diamino-3-tert-butyltoluene.

4. The composition of claim 1 wherein $R_1$ is ethyl and $R_2$ is methyl or ethyl and $R_3$ is a methyl group.

5. The composition of claim 1 wherein $R_1$ is methyl and $R_2$ and $R_3$ are combined into a ring having from 5-6 carbon atoms.

6. The composition of claim 6 wherein $R_1$ is ethyl $R_2$ is ethyl and $R_3$ is methyl.

7. The composition of claim 1 wherein $R_2$ and $R_3$ are combined and represent a six carbon membered ring.

8. The composition of claim 1 wherein $R_1$ is methyl and $R_2$ and $R_3$ are methyl or ethyl groups.

9. The composition of claim 1 wherein $R_2$ and $R_3$ are combined to form a 5 carbon membered ring.

10. A toluenediamine composition containing approximately 65-80% by weight of 2,4-diamino-5-tert-butyltoluene, 20-35% by weight of 2,6-diamino-3-tert-butyltoluene, and 0-5% by weight of either 3,4 diamino-5-tert-butyltoluene and 2,3-diamino-4-tert-butyltoluene or both.

* * * * *